United States Patent
Tione

(10) Patent No.: US 12,441,289 B2
(45) Date of Patent: Oct. 14, 2025

(54) ELECTROMECHANICAL BRAKING ACTUATOR FOR A VEHICLE, PARTICULARLY FOR AT LEAST ONE RAILWAY VEHICLE, AND BRAKING SYSTEM

(71) Applicant: FAIVELEY TRANSPORT ITALIA S.P.A., Piossasco (IT)

(72) Inventor: Roberto Tione, Lauriano (IT)

(73) Assignee: Faiveley Transport Italia S.P.A., Piossasco (IT)

( * ) Notice: Subject to any disclaimer, the term of this patent is extended or adjusted under 35 U.S.C. 154(b) by 330 days.

(21) Appl. No.: 18/005,050

(22) PCT Filed: Jul. 13, 2021

(86) PCT No.: PCT/IB2021/056292
§ 371 (c)(1),
(2) Date: Jan. 10, 2023

(87) PCT Pub. No.: WO2022/013737
PCT Pub. Date: Jan. 20, 2022

(65) Prior Publication Data
US 2023/0339448 A1    Oct. 26, 2023

(30) Foreign Application Priority Data
Jul. 13, 2020 (IT) .................. 102020000016912

(51) Int. Cl.
*B60T 17/22* (2006.01)
*B60T 13/74* (2006.01)
(Continued)

(52) U.S. Cl.
CPC .......... *B60T 17/228* (2013.01); *B60T 13/746* (2013.01); *B61H 15/00* (2013.01); *F16D 65/28* (2013.01);
(Continued)

(58) Field of Classification Search
CPC .... B60T 17/228; B60T 17/221; B60T 13/746; B60T 2270/406; B61H 15/00; F16D 65/28
See application file for complete search history.

(56) References Cited

FOREIGN PATENT DOCUMENTS

| EP | 2154391 A1 | 2/2010 |
|----|-----------|--------|
| EP | 3346155 A1 | 7/2018 |

OTHER PUBLICATIONS

"Railway applications. The specification and demonstration of reliability, availability, maintainability and safety (RAMS)," British Standard EN50126, Available Online at http://106.38.59.21:8080/userfiles/5858172dad464f008c445c257aafe03c/files/teckSolution/2019/12/BS%20EN%2050126-1999.pdf, Dec. 15, 1999, 73 pages.
(Continued)

*Primary Examiner* — Timothy Hannon
(74) *Attorney, Agent, or Firm* — K&L Gates LLP

(57) ABSTRACT

An electromechanical braking actuator for a vehicle, particularly for a railway vehicle, is described, which comprises a safety unit arranged to receive an electrical position signal, the value of which is indicative of the position of braking force application means along a translation axis; to determine an instantaneous position of braking force application means, based on the value of an electrical position signal; and, through first interruption means, to prevent a braking force control signal emitted by the service braking control unit, or a power supply signal, from reaching the electromechanical module, when: a) the safety unit determines that the braking force application means are in a position between a maintenance position and a rest position; b) the safety unit determines that the braking force application means are moving from the rest position to the maintenance position. A braking system is also described.

20 Claims, 6 Drawing Sheets

(51) Int. Cl.
*B61H 15/00* (2006.01)
*F16D 65/28* (2006.01)

(52) U.S. Cl.
CPC ....... *B60T 17/221* (2013.01); *B60T 2270/406* (2013.01)

(56) References Cited

OTHER PUBLICATIONS

"Railway applications. Communication, signaling and processing systems. Safety-related communication in transmission systems," EN50159, Available Online at https://gost-snip.su/download/pds_en_50159_2010_railway_applications_communication_signall, Sep. 2010, 68 pages.

"Railway applications. Communications, signalling and processing systems. Software for railway control and protection systems," European Standard EN50128, Available Online at https://pdfcoffee.com/qdownload/bs-en-50128-searchablepdf-pdf-free.html, Jun. 2011, 134 pages.

"Railway applications. Communication, signaling and processing systems. Safety related electronic systems for signalling," European Standard EN50129, Available Online at https://gost-snip.su/download/bds_en_50129_2004_railway_applications_communication_signall, Nov. 2018, 101 pages.

ISA European Patent Office, International Search Report Issued in Application No. PCT/IB2021/056292, Nov. 18, 2021, WIPO, 2 pages.

ELECTROMECHANICAL BRAKING ACTUATOR FOR A VEHICLE, PARTICULARLY FOR AT LEAST ONE RAILWAY VEHICLE, AND BRAKING SYSTEM

CROSS REFERENCE TO RELATED APPLICATIONS

The present application is a U.S. National Phase of International Application No. PCT/IB2021/056292 entitled "ELECTROMECHANICAL BRAKING ACTUATOR FOR A VEHICLE, PARTICULARLY FOR AT LEAST ONE RAILWAY VEHICLE, AND BRAKING SYSTEM," and filed on Jul. 13, 2021. International Application No. PCT/IB2021/056292 claims priority to Italian Patent Application No. 102020000016912 filed on Jul. 13, 2020. The entire contents of each of the above-listed applications are hereby incorporated by reference for all purposes.

TECHNICAL FIELD

The present invention is generally in the field of braking systems; in particular, the invention relates to an electromechanical braking actuator for a vehicle, particularly for at least one railway vehicle, and a braking system.

PRIOR ART

In the following description, reference will be made to the following European standards, according to the latest version available on Apr. 1, 2020:
EN50126 ["Railway applications. The specification and demonstration of reliability, availability, maintainability and safety (RAMS);
EN50128 ["Railway applications. Communications, signalling and processing systems. Software for railway control and protection systems"];
EN50129 ["Railway applications. Communication, signaling and processing systems. Safety related electronic systems for signalling"];
EN50159 [*Railway applications. Communication, signaling and processing systems. Safety-related communication in transmission systems"].

In particular, standard EN50126 defines the methodologies for assigning the safety levels SIL0/1/2/3/4 (with safety level SIL4 indicating the maximum safety level) to the subsystems making up the system in question, based on the results of the Safety Analysis, and standards EN50128 and EN50129 define the design criteria to be applied to the software and hardware components respectively on the basis of the SIL levels assigned based on said results of the Safety Analysis.

It is known from the prior art that:
the safety calculations relating to the emergency braking functions carried out according to European standard EN50126 systematically assign a Safety Integrity Level, SIL, $SIL \geq 3$ to said emergency braking functions, and consequently normally to the subsystems that implement them;
the safety calculations relating to the service braking functions carried out in accordance with European standard EN50126 normally assign a Safety Integrity Level $SIL \leq 2$ to said service braking functions, and consequently normally to the subsystems that implement them;

the development of a control unit, typically microprocessor-based or FPGA-based, according to safety integrity levels $SIL \geq 3$ in accordance with EN50128 and EN50129, involves design, validation, and certification costs that are approximately an order of magnitude higher than design according to $SIL \leq 2$ safety integrity levels.

In relation to the last of the preceding points, it is obvious that it is worthwhile to keep the functions to be developed according to the $SIL \geq 3$ safety levels extremely limited and simple.

FIG. 1 illustrates a pneumatic braking actuator 100 according to the state of the art. The mechanical assembly 101 is known to one skilled in the art as a slack adjuster.

With the succession of braking, pads and discs undergo continuous wear over time. Thus, the idle travel of the braking actuator would increase over time, consequently increasing the delays in applying braking.

The object of the slack adjuster is to maintain a constant distance at rest, in the non-braking condition, between the braking surface of the brake pads and the surface of the disc, as the thickness of the brake pads and the disc continuously decreases, due to wear caused by braking. In this way, the delay in the application of braking due to the idle travel of the levers remains constant over time, allowing a precise calculation of the braking times or stopping distances of the vehicle or train, especially in the case of emergency braking.

It is well known to those skilled in the art that the idle travel of the braking actuator levers, at the point of attachment between the levers and the braking cylinder, is defined as "dimension A," hereinafter referred to as distance "A."

Purely by way of information, the dimension A has a typical value of 2 mm in the case of a disc actuator, and a typical value of 6 mm in the case of a wheel actuator.

The same shoe and wheel wear adjustment mechanism is applied in the case of a shoe braking device.

The functional complexity of the mechanical assembly 101, with the resulting complexity of assembly and testing, as well as final cost, is evident.

Disadvantageously, in known braking actuators, the procedure for resetting the initial distance A is performed manually with each replacement of the friction means of the braking force application means 217 by the operator tasked with replacing the friction means, and requires special attention and tools.

FIG. 2 illustrates a functional block diagram for an electromechanical braking actuator 200 according to the prior art.

An electromechanical module 201 comprises at least one electric motor and possibly a speed reducer, i.e., a torque multiplier, and may extend or retract a force transmission member (i.e., an arm 206) connected to an emergency braking module 207.

The emergency braking module 207 comprises emergency braking energy storage means 208, for example, a mechanical storage element of mechanical potential energy or kinetic energy.

Essentially, the emergency braking module 207 is controlled by an electrical signal 210 and is arranged to be able to assume a first state in which it does not release the stored energy to perform an emergency braking when an emergency braking request signal 210 does not indicate the need for an emergency braking request. Further, the emergency braking module 207 controlled by an electrical signal 210 is arranged to be able to assume a second state in which it releases the stored energy to perform an emergency braking when the emergency braking request signal 210 indicates the presence of a request for emergency braking and thus the need to perform an emergency braking.

It is not necessary for the purposes of the present invention to go into a more detailed description of the operation of said emergency braking module 207.

Another force transmission member (i.e., the arm 211), is connected to force sensor means 212, which are arranged to generate a braking force indicative electrical signal 213, the value of which is indicative of the mechanical force applied between the force transmission member 211 and yet another force transmission member (i.e., the arm 216).

The braking force indicative electrical signal 213 is input to a service braking control unit 202.

The arm 216 is connected to the force sensor means 212 and braking force application means 217.

The braking force application means 217 are represented graphically by way of example by recalling a braking device/actuator with brake shoes on a wheel; however, braking force application means 217 may, for example, take other forms, such as a lever braking device/actuator with pads on a disc.

The service braking control unit 202, being electronic in nature, may receive at its input a power supply signal 205, conveying a power supply voltage, not exclusively originating from the battery of the vehicle.

The service braking control unit 202 is arranged to modulate the power supply voltage to control the electric motor comprised in the electromechanical module 201 through at least one electric braking force control signal 204.

The service braking control unit 202 receives as input at least one angular position signal 219 that does not exclusively indicate the angular position and the direction of rotation of rotating members present within the electromechanical module 201.

In a possible non-exclusive embodiment, the at least one angular position signal 219 includes angular position signals generated by Hall sensors belonging to a BLDC-type motor.

Through a counting and integration method performed by the service braking control unit 202, the service braking control unit 202 obtains the instantaneous elongation value of the arm 206 continuously over time, i.e., the position of the braking force application means 217.

In another possible embodiment, position sensor means 220 (e.g., a position sensor) read the translational position of the arm 206 indicating its instantaneous elongation value to the service braking control unit 202 continuously over time through an electrical position signal 221. i.e., indicating the position of the braking force application means 217.

The diagram shown in FIG. 3 illustrates the relationship between the position P of the arm 206 and the force F applied by the braking force application means 217.

Assuming the initial position of the arm 206 corresponding to the abscissa valueP=−A, i.e. corresponding to the rest position corresponding to the distance A, the applied force F has a null value for the entire distance covered by the arm 206, from the abscissa value −A and the value 0, corresponding to the point of initial contact between the braking force application means 217 and the braking force receiving means (dissipation means), i.e., the braking disc in the case of disc brakes, or the wheel in the case of wheel brakes.

Positive position values P correspond to positive force values F applied by the braking force application means 217.

The angular coefficient of segment E represents the elasticity of the braking force application means 217. The greater the elasticity, the smaller the angular coefficient.

Assuming now that the actuator has applied a braking force F' corresponding to the position P', upon request to cancel the braking force, the service braking control unit 202 commands the electromechanical module 201 to retract the arm 206 with a predetermined speed.

At the same time, the service braking control unit 202 receives the position value of the arm 206 through the position signal 221, i.e., by counting and integrating the revolutions of the rotating members of the electromechanical module 201 through the at least one angular position signal 219.

When the braking force indicative electrical signal 213 indicative of the applied force value F reaches the null value, the service braking control unit 202 continues to command the electromechanical module 201 to retract the arm 206 until the position −A is reached.

In this way, the wear suffered by the shoe and wheel is compensated for at each braking.

The dimensional resolution recovered corresponds to the measurement resolution of the arm position 206 through the heretofore described methods.

The solution described advantageously removes the complex mechanical assembly 101 known as the slack adjuster with a simple software procedure performed by the service braking control unit 202 each time the service brake is released.

A method similar to what is reported as prior art described thus far is claimed in European patent EP3346155.

It is prior art that the service braking control unit 202 is normally developed according to safety levels SIL<=2 with regard to the standards EN50128 and EN50129.

In said case, a malfunction of the software function that controls the recovery of distance A may occur with a probability specific to the SIL safety level<=2.

Since the software is the same on all braking actuators on a train, the software must be considered as a common mode fault source, i.e., the fault may be considered simultaneous on the entire train.

A malfunction of the software function controlling the adjustment of the distance A may manifest itself in the form of a failure to stop at point −A in the diagram in FIG. 3, continuing to retract the arm 206 to the maintenance position −B (end-of-travel position), corresponding to the position required for maintenance of the braking force application means 217. Maintenance of the braking force application means 217 may, for example, require replacement of the friction means of said braking force application means 217.

The position −B may be several tens of millimeters, which is an order of magnitude greater than the position −A.

In this case, the braking application delay may reach values of several seconds.

If an emergency braking is requested after the occurrence of the software malfunction in a common mode along the whole train, at a typical speed of a regional train of 160 km/h, the stopping distance will be lengthened by about 44 m for each second of delay.

This consideration leads to the determination that the software function that controls the recovery of the distance A. and the hardware on which it is executed, must be developed to the same safety level as the emergency braking, i.e., the service braking control unit 202 must be fully developed to an SIL level>=3 according to the standards EN50128 and EN50129

Disadvantageously, this requirement has a high impact on the development and production cost of the service braking control unit, which is already very complex in its current solution complying with the safety level SIL≤=2.

SUMMARY OF INVENTION

Thus, an object of the present invention is to provide an electromechanical braking actuator for a vehicle, particularly for at least one railway vehicle, which may prevent improper conduct of the braking force application means in the maintenance position.

Another object of the present invention is therefore to provide an electromechanical braking actuator for a vehicle, particularly for at least one railway vehicle, implemented by means of a software solution, at a low cost while maintaining all the safety requirements compatible with the state-of-the-art emergency brake, the electromechanical braking actuator being able in some embodiments, to recover the distance A, i.e., the consumption of the shoe and wheel or of the pads and disc.

Yet another object of the present invention is to provide an electromechanical braking actuator having a procedure for safe maintenance of braking force application means.

The aforesaid and other objects and advantages are achieved, according to an aspect of the invention, by an electromechanical braking actuator for a vehicle, particularly for at least one railway vehicle, having the features defined in claim 1; by an electromechanical braking actuator for a vehicle, particularly for at least one railway vehicle, and having the features defined in claim 9.

Preferred embodiments of the invention are defined in the dependent claims, the content of which is to be understood as an integral part of the present description.

BRIEF DESCRIPTION OF THE DRAWINGS

The functional and structural features of some preferred embodiments of an electromechanical braking actuator for a vehicle, particularly for at least one railway vehicle according to the invention, will now be described. Reference is made to the appended drawings, wherein.

DETAILED DESCRIPTION

Figure 1:
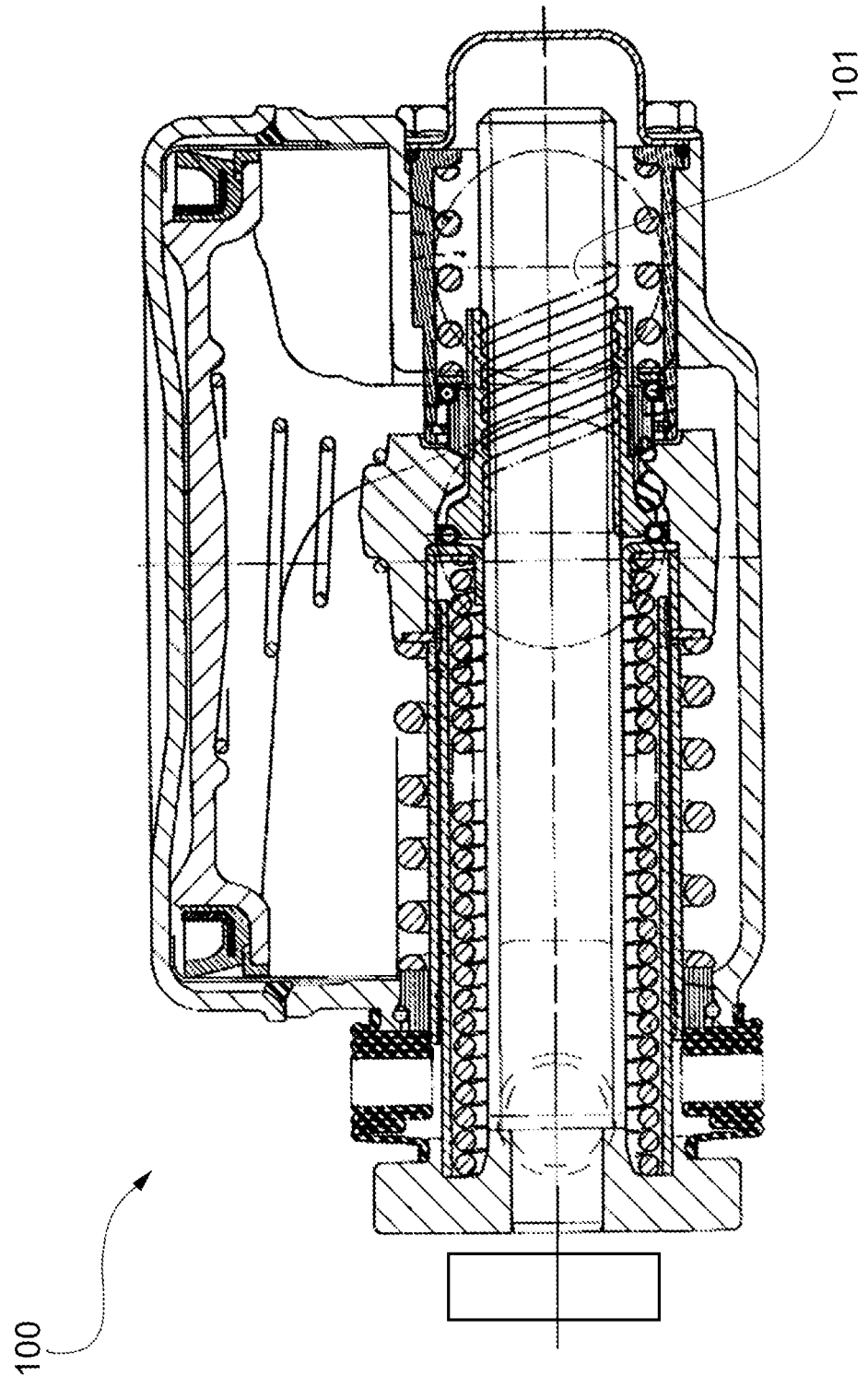
FIG. 1 illustrates a pneumatic type braking actuator according to the prior art.
Figure 2:
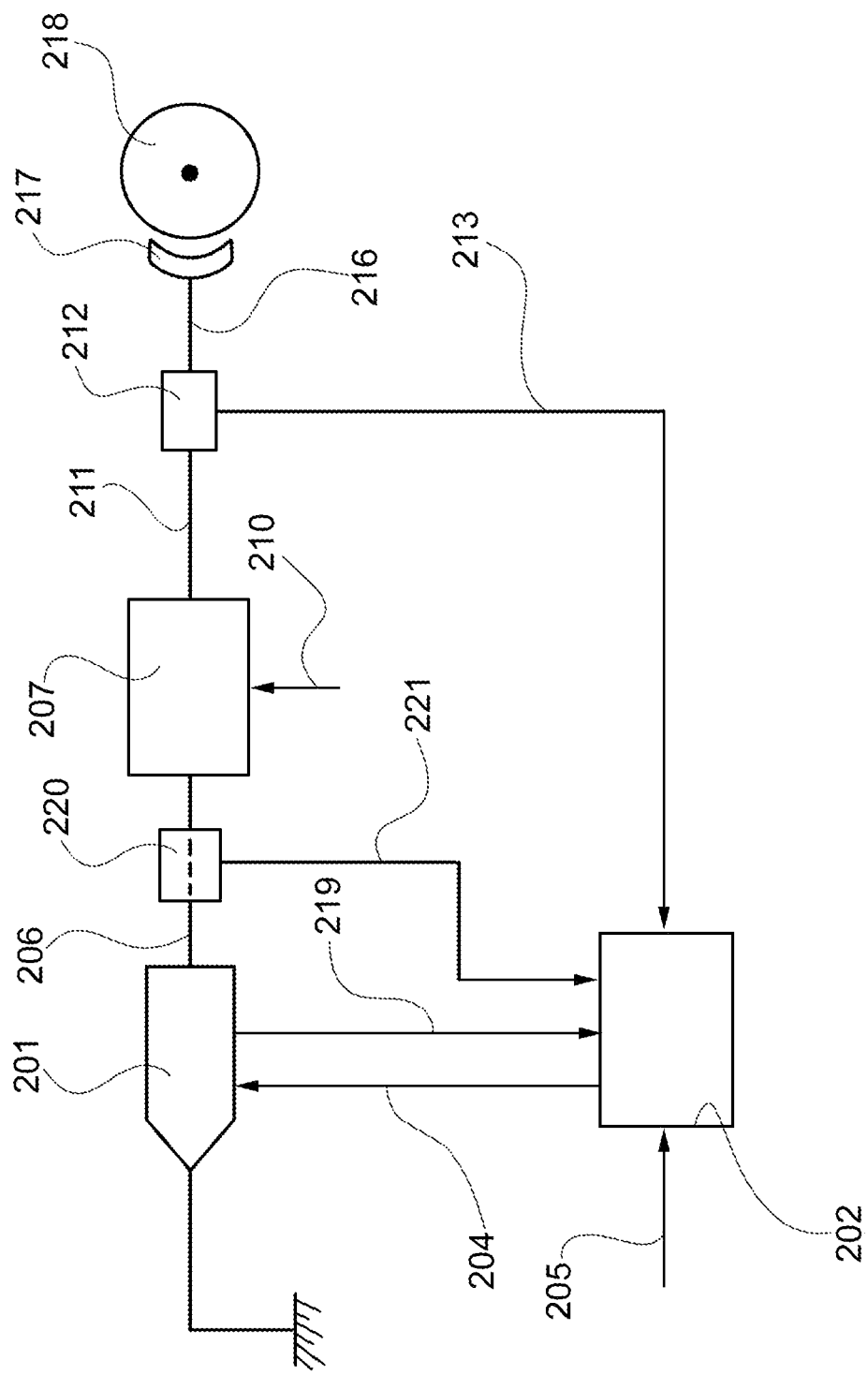
FIG. 2 illustrates a non-exclusive example of a functional diagram of an electromechanical braking actuator according to the prior art.
Figure 3:
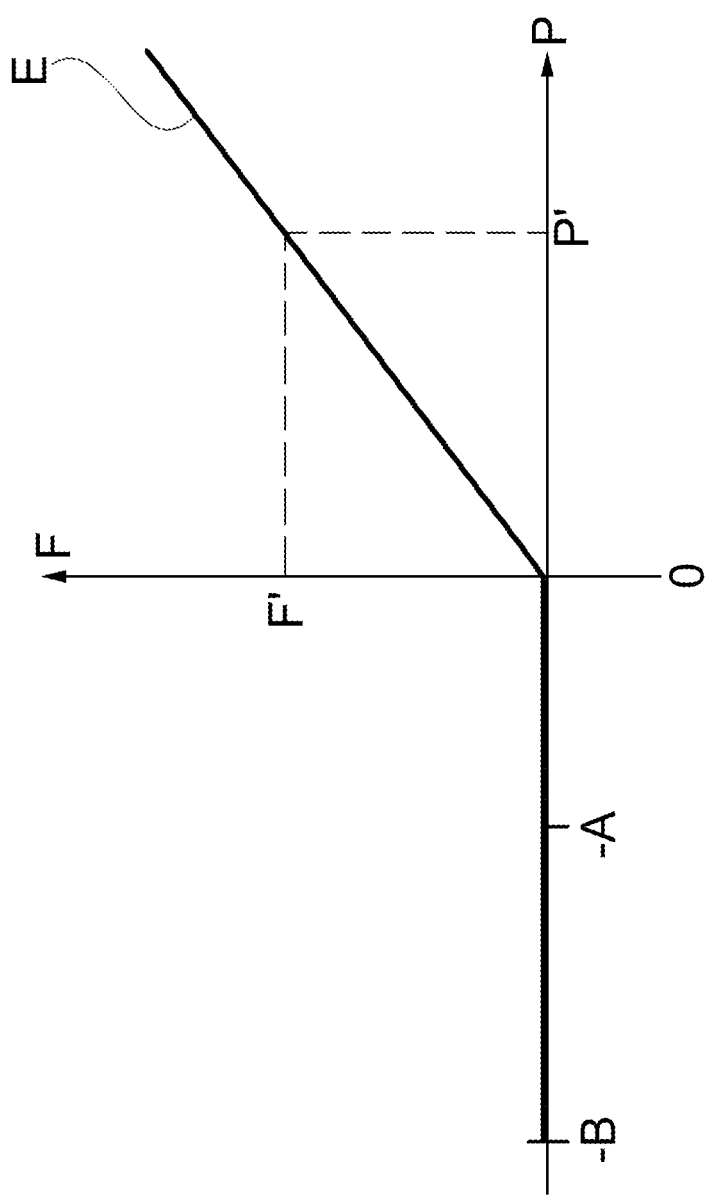
FIG. 3 illustrates a diagram linking the braking force applied to a brake shoe, i.e., brake pads, to the linear travel of one or more braking force transmission members present.

Before describing a plurality of embodiments of the invention in detail, it should be clarified that the invention is not limited in its application to the construction details and configuration of the components presented in the following description or illustrated in the drawings. The invention may assume other embodiments and be implemented or constructed in practice in different ways. It should also be understood that the phraseology and terminology have a descriptive purpose and should not be construed as limiting. The use of "include" and "comprise" and their variations is to be understood as encompassing the elements set out below and their equivalents, as well as additional elements and the equivalents thereof.

In a first embodiment, an electromechanical braking actuator 400 for at least one vehicle, particularly for at least one railway vehicle, according to the invention comprises a service braking control unit 202 arranged to receive a service braking force request electrical signal 203 and to generate a braking force control signal 204, the value of which is a function of said service braking force request electrical signal 203.

In addition, the electromechanical actuator 400 comprises an electromechanical module 201 arranged to receive the braking force control signal 204 generated by the service braking control unit 202 and to generate a braking force, the value of which is a function of the braking force control signal 204. The electromechanical module 201 is arranged also to receive power through said braking force control signal 204. In this case, the signal 204 may be considered a power and braking force control signal.

Additionally, the electromechanical actuator 400 comprises at least one force transmission member 206, 211, 216 arranged to transmit the braking force generated by the electromechanical module 201 to braking force application means 217. The at least one force transmission member 206, 211, 216 is arranged to be controlled by the electromechanical module 201 so as to translate along a translation axis Xt. Translating the at least one force transmission member 206, 211, 216 according to a first application direction results in an increase in the braking force applied by the braking force application means 217, and translating the at least one force transmission member 206, 211, 216 according to a second application direction opposite the first application direction results in a decrease in the braking force applied by the braking force application means 217.

Still further, the electromechanical actuator 400 comprises a safety unit 401 arranged to:

receive an electrical position signal 221, the value of which is indicative of the position of said braking force application means 217 along said translation axis Xt;

determine an instantaneous position of the braking force application means 217 from the electrical position signal 221; and through first interruption means 403, prevent the braking force control signal 204 emitted by the service braking control unit 202 from reaching the electromechanical module 201, when:

a) from the value of the electrical position signal 221, the safety unit 401 determines that the braking force application means 217 are at a position along a force application axis Xb between a service position at a first distance −B from said braking force receiving means, and a rest position at a second distance −A from said braking force receiving means 218, which is less than said first distance −B;

b) the safety unit, based on changes in the value of the electrical position signal 221 over time, determines that the braking force application means 217 are moving from the rest position to the maintenance position.

As may be seen, the translation axis Xt and the application axis of braking force Xb may be coincident, or parallel, or lie in different planes.

Preferably, the safety unit 401 may be arranged to receive a maintenance request signal 222 arranged to assume a first value indicative of the non-necessity of bringing the braking force application means 217 into the maintenance position, and to assume a second value indicative of the necessity of bringing the braking force application means 217 into the maintenance position. In this case, the safety unit 401 may be arranged to:

through the first interruption means 403, prevent the braking force control signal 204 emitted by the service braking control unit 202 from reaching the electromechanical module 201, when:

a) both the maintenance request signal 222 assumes its first value and the safety unit 401 determines, from the value of the electrical position signal 221, that the braking force application means 217 are at a position along said braking force application axis Xb between said maintenance position and the rest position;

b) the safety unit, based on changes in the value of the electrical position signal 221 over time, determines that the braking force application means 217 are moving from the rest position to the maintenance position.

Preferably, the safety unit 401 is further arranged to receive a maintenance validation signal 223, arranged to assume a first value indicative of a non-confirmation of permission to bring the braking force application means 217 into the maintenance position, to assume a second value indicative of a confirmation of permission to bring the braking force application means 217 into the maintenance position. In this case, the safety unit 401 may be arranged to:

through the first interruption means 403, prevent the braking force control signal 204 emitted by the service braking control unit 202 from reaching the electromechanical module 201, when:

a) both the maintenance request signal 222 and the maintenance validation signal 223 assume their respective first values, and the safety unit 401 determines, from the value of the electrical position signal 221, that the braking force application means 217 are at a position along said braking force application axis Xb between said maintenance position and said rest position;

b) the safety unit, based on changes in the value of the electrical position signal 221 over time, determines that the braking force application means 217 are moving from the rest position to the maintenance position.

Otherwise, or additionally, the security unit 401 may be arranged to:

through the first interruption means 403, prevent the braking force control signal 204 emitted by the service braking control unit 202 from reaching the electromechanical module 201, when the maintenance request signal 222 and the maintenance validation signal 223 assume different values from each other (i.e., discordant values, for example, the maintenance request signal 222 assumes its first value and the maintenance validation signal 223 does not assume its first value, or, the maintenance request signal 222 assumes its second value and the maintenance validation signal 223 does not assume its second value), and the safety unit 401 determines, from the electrical position signal 221, that the braking force application means 217 are at a position along said braking force application axis Xb between said maintenance position and said rest position;

Otherwise, or additionally, said safety unit 401 may also be arranged to:

through the first interruption means 403, allow the braking force control signal 204 emitted by the service braking control unit 202 to reach the electromechanical module 201, when both the maintenance request signal 222 and the maintenance validation signal 223 assume their respective second values, and the safety unit 401 determines, from the electrical position signal 221, that the braking force application means 217 are in the rest position.

Moreover, the safety unit 401 may be arranged, through the first interruption means 403, to prevent the braking force control signal 204 emitted by the service braking control unit 202 from reaching the electromechanical module 201, when:

both the maintenance request signal 222 and the maintenance validation signal 223 assume their respective second values; and the safety unit 401 determines, from the electrical position signal 221, that the braking force application means 217 are in said maintenance position.

Preferably, the electromechanical braking actuator 400 may comprise force sensor means, such as a force sensor, arranged to generate a braking force indicative electrical signal 213, the value of which is indicative of the value of the braking force generated by the electromechanical module 201. In embodiments wherein only the maintenance request signal 222 is present, the service braking control unit 202 may then be arranged to receive the braking force indicative electrical signal 213, and when the braking force application means 217 are in said maintenance position and the maintenance request signal 222 assumes its first value:

the safety unit 401 may be arranged, through the first interruption means 403, to allow the braking force control signal 204 emitted by the service braking control unit 202 to again reach the electromechanical module 201;

the service braking control unit 202 may be arranged, by means of the braking force control signal 204, to bring the braking force application means 217 into a braking application position in contact with said braking force receiving means 218, in which the service braking control unit 202 is arranged to determine that the braking force application means 217 have reached the braking application position when said braking force indicative electrical signal 213, after having assumed a null value, assumes a non-null value (i.e., changes from a null value to a non-null value);

when said braking force application means 217 reach the braking application position in contact with said braking force receiving means 218, the service braking control unit 202 may be arranged, through the braking force control signal 204, to bring the braking force application means 217 into a new rest position having again said second distance −A from the determined braking application position.

In embodiments wherein both the maintenance request signal 222 and the maintenance validation signal 223 are present, when the braking force application means 217 are in the maintenance position, and both the maintenance request signal 222 and maintenance validation signal 223 assume their respective first values:

the safety unit 401 may be arranged, through the first interruption means 403, to allow the braking force control signal 204 emitted by the service braking control unit 202 to again reach the electromechanical module 201;

the service braking control unit 202 may be arranged, through the braking force control signal 204, to bring the braking force application means 217 into a braking application position in contact with said braking force receiving means 218, in which the service braking control unit 202 is arranged to determine that the braking application position coincides with the position of the braking force application means 217 when said braking force indicative electrical signal 213, after having assumed a null value, assumes a non-null value (i.e., changes from a null value to a non-null value);

when said braking force application means 217 reach the braking application position in contact with said braking force receiving means 218, the service braking control unit 202 may be arranged, through the braking force control signal 204, to bring the braking force application means 217 into a new rest position having again said second distance –A from the determined braking application position.

Furthermore, when the braking force indicative electrical signal 213, after assuming a non-null value, again assumes a null value, (i.e., changes from a non-null value to a null value) the service braking control unit 202 may be arranged to determine a braking release position wherein the braking force application means 217 are no longer in contact with said braking force receiving means 218;

the service braking control unit 202 may be arranged to bring the braking force application means 217, through said braking force control signal 204, into a new rest position having again said second distance –A from the determined braking release position.

In a second embodiment, the electromechanical module 201 of the electromechanical braking actuator 400 for a vehicle, particularly for at least one railway vehicle, instead of receiving a power supply through the braking force control signal 204, receives a power supply through a special power supply signal 405.

In said case, the safety unit 401 will be arranged, through first interruption means 403', to prevent the power signal 405 from reaching the electromechanical module 201, when:
 a) from the value of the electrical position signal 221, the safety unit 401 determines that the braking force application means 217 are at a position along a braking force application axis Xt between a service position at a first distance –B from said braking force receiving means, and a rest position at a second distance –A from said braking force receiving means, which is less than said first distance –B;
 b) the safety unit, based on changes in the value of the electrical position signal 221 over time, determines that the braking force application means 217 are moving from the rest position to the maintenance position.

Preferably, also for this second embodiment, the safety unit 401 may also receive the maintenance request signal 222. In said case, the safety unit 401 may be arranged, by means of first interruption means 403', to prevent the power signal 405 from reaching the electromechanical module 201, when:
 a) The safety unit 401 determines, from the value of the electrical position signal 221, that the braking force application means 217 are at a position along the braking force application axis Xt between said maintenance position and the rest position;
 b) the safety unit, based on changes in the value of the electrical position signal 221 over time, determines that the braking force application means 217 are moving from the rest position to the maintenance position.

Preferably, also for this second embodiment the safety unit 401 may be arranged to receive the maintenance validation signal 223. In said case, said safety unit 401 may be arranged, by means of first interruption means 403', to prevent the power signal 405 from reaching the electromechanical module 201, when:
 a) both the maintenance request signal 222 and the maintenance validation signal 223 assume their respective first values, and the safety unit 401 determines, from the value of the electrical position signal 221, that the braking force application means 217 are at a position along said braking force application axis Xb between said maintenance position and said rest position;
 b) the safety unit, based on changes in the value of the electrical position signal 221 over time, determines that the braking force application means 217 are moving from the rest position to the maintenance position.

Otherwise, or additionally, the safety unit 401 may be arranged to:
 through the first interruption means 403', prevent the power signal 405 from reaching the electromechanical module 201, when the maintenance request signal 222 and the maintenance validation signal 223 assume different values from each other (i.e., discordant values, for example the maintenance request signal 222 assumes its first value and the maintenance validation signal 223 does not assume its first value, or, the maintenance request signal 222 assumes its second value and the maintenance validation signal 223 does not assume its second value), and the safety unit 401 determines, from the electrical position signal 221, that the braking force application means 217 are at a position along said braking force application axis Xb between said maintenance position and said rest position.

Otherwise, or additionally, the safety unit 401 may also be arranged to:
 through the first interruption means 403', allow the power signal 405 to reach the electromechanical module 201, when both the maintenance request signal 222 and the maintenance validation signal 223 assume their respective second values, and the safety unit 401 determines, from the electrical position signal 221, that the braking force application means 217 are in the rest position.

Preferably, with reference to the second embodiment, the safety unit 401 may be further arranged, through second interruption means 406, to prevent the braking force control signal 204 emitted by the service braking control unit 202 from reaching the electromechanical module 201, when the safety unit prevents, through said first interruption means 403', the power signal 405 from reaching the electromechanical module 201.

Also in this second embodiment, the electromechanical actuator 400 may comprise force sensor means 212 arranged to generate a braking force indicative electrical signal 213, the value of which is indicative of the value of said braking force generated by the electromechanical module 201. The service braking control unit may be arranged to receive said braking force indicative electrical signal 213.

In the case wherein there is only the maintenance request signal 222, when the braking force application means 217 are in the maintenance position and the maintenance request signal 222 takes its first value:
 the safety unit 401 may be arranged, through the first interruption means 403', to allow the power signal 405 to reach the electromechanical module 201 again;
 the service braking control unit 202 may be arranged, through the braking force control signal 204, to bring the braking force application means 217 into a braking application position in contact with the braking force receiving means 218, wherein the service braking control unit 202 is arranged to determine that the braking force application means 217 have reached the braking application position when the braking force indicative electrical signal 213, after assuming a null value, assumes a non-null value;

when the braking force application means 217 reach the braking application position in contact with the braking force receiving means 218, the service braking control unit 202 may be arranged, through the braking force control signal 204, to bring the braking force application means 217 into a new rest position having again said second distance −A from the determined braking application position.

In the case wherein both the maintenance request signal 222 and the maintenance validation signal 223 are present, when the braking force application means 217 are in said maintenance position and both the maintenance request signal 222 and maintenance validation signal 223 assume their respective first values:

the safety unit 401 may be arranged, through the first interruption means 403', to allow the power signal 405 to reach the electromechanical module 201 again;

the service braking control unit 202 may be arranged, through the braking force control signal 204, to bring the braking force application means 217 into a braking application position in contact with said braking force receiving means 218, wherein the service braking control unit 202 is arranged to determine that the braking application position coincides with the position at which said braking force application means 217 are located when said braking force indicative electrical signal 213, after assuming a null value, assumes a non-null value (i.e., changes from a null value to a non-null value);

when the braking force application means 217 reach the braking application position in contact with the braking force receiving means 218, the service braking control unit 202 may be arranged, through the braking force control signal 204, to bring the braking force application means 217 into a new rest position having again said second distance −A from the determined braking application position.

Additionally, when the braking force indicative electrical signal 213, after assuming a non-null value, again assumes a null value, the service braking control unit 202 may be arranged to determine a braking release position in which the braking force application means 217 are no longer in contact with said braking force receiving means 218. The service braking control unit 202 may be arranged to bring, through the braking force control signal 204, the braking force application means 217 into a new rest position having again said second distance −A from the determined braking release position.

Still in reference to all heretofore described embodiments, the electrical position signal 221 may be generated by position sensor means 220 arranged to measure a position of the at least one force transmission member 206, 211, 216 along the translation axis Xt. Otherwise, the electromechanical module 201 may include at least one rotating mechanical member and the electrical position signal 221 may be generated by angular position sensor means arranged to measure the angular position and rotation direction of the at least one rotating member of the electromechanical module 201.

Still with reference to all of the heretofore described embodiments, the electromechanical actuator 400 may comprise an emergency braking module 207 including emergency braking energy storage means 208 arranged to store energy to be used for at least one emergency braking. In said case, the emergency braking module 207 may be arranged to receive an emergency braking request signal 210 and to assume a first state wherein it does not release stored energy into the emergency braking storage means 208 when the emergency braking request signal 210 does not assume a value indicative of a need to perform emergency braking, and a second state wherein it releases stored energy into the emergency braking storage means 208 when the emergency braking request signal 210 assumes a value indicative of a need to perform an emergency braking.

Still in reference to all of the heretofore described embodiments, the safety unit 401 may be developed according to a safety integrity level SIL greater than a safety integrity level SIL with which the service braking control unit 202 is developed. Furthermore, the safety unit 401 may be developed according to a safety integrity level SIL>=3. Additionally, the safety unit 401 may include a microprocessor and/or an FPGA.

In the following, referring to FIG. 4, the operation of the braking actuator 400 is described in detail in other words, with reference to embodiments wherein the electromechanical module 201 receives power through the braking force control signal 204.

In this first example embodiment, the electromechanical braking actuator 400 is provided for both service and emergency braking.

The electromechanical braking actuator 400 comprises an electromechanical module 201 for generating a first braking force arranged to receive the braking force control signal 204 and to generate the braking force, the value of which is a function of said braking force control signal 204.

The electromechanical module 201 may comprise, for example, an electric motor 230, not exclusively connected to a mechanical speed reducer 231. Additionally, the electromechanical module 201 may comprise a mechanical conversion member for converting from rotational movement to translational movement 232. This mechanical conversion member for converting from rotational to translational motion 232 may be driven directly by the electric motor 230 or, possibly, by the mechanical speed reducer 231. The mechanical conversion member for converting from rotational to translational motion 232 may be arranged to transmit the braking force to a plurality of force transmission members 206, 211, 216 arranged to transmit the braking force from the electromechanical module 201 to the braking force application means 217. The braking force application means 217 may be at least one braking force application device 217.

Along the mechanical force transmission chain, the emergency braking module 207 may be present, comprising emergency braking energy storage means 208, such as for example a mechanical potential energy storage element or kinetic energy storage element.

Essentially, the emergency braking module 207 may be controlled by the electrical emergency braking request signal 210, and may be arranged to have a first state where it does not release energy stored in the emergency braking energy storage means 208 for an emergency braking, when the emergency braking request signal 210 does not indicate a request for an emergency braking, and a second state where it releases the energy stored in the emergency braking energy storage means 208 to apply an emergency braking, when the emergency braking request signal 210 indicates a request for an emergency braking.

The electromechanical module 201 may be arranged to generate at least the angular position signal 219, indicating the angular position value of one of the rotating elements comprised in the electromechanical module.

If the electric motor 230 is a BLDC-type electric motor, the at least one angular position signal 219 indicating the angular position value may not exclusively comprise signals generated by Hall sensors of said BLDC-type electric motor 230.

Alternatively, not exclusively, the at least one angular position signal 219 indicating the angular position value of one of the rotating elements comprised in the electromechanical module 201 may comprise signals generated by magnetic sensors indicating the amount and direction of rotation of one of the rotating mechanical elements comprised in the electromechanical module 201.

Figure 4:
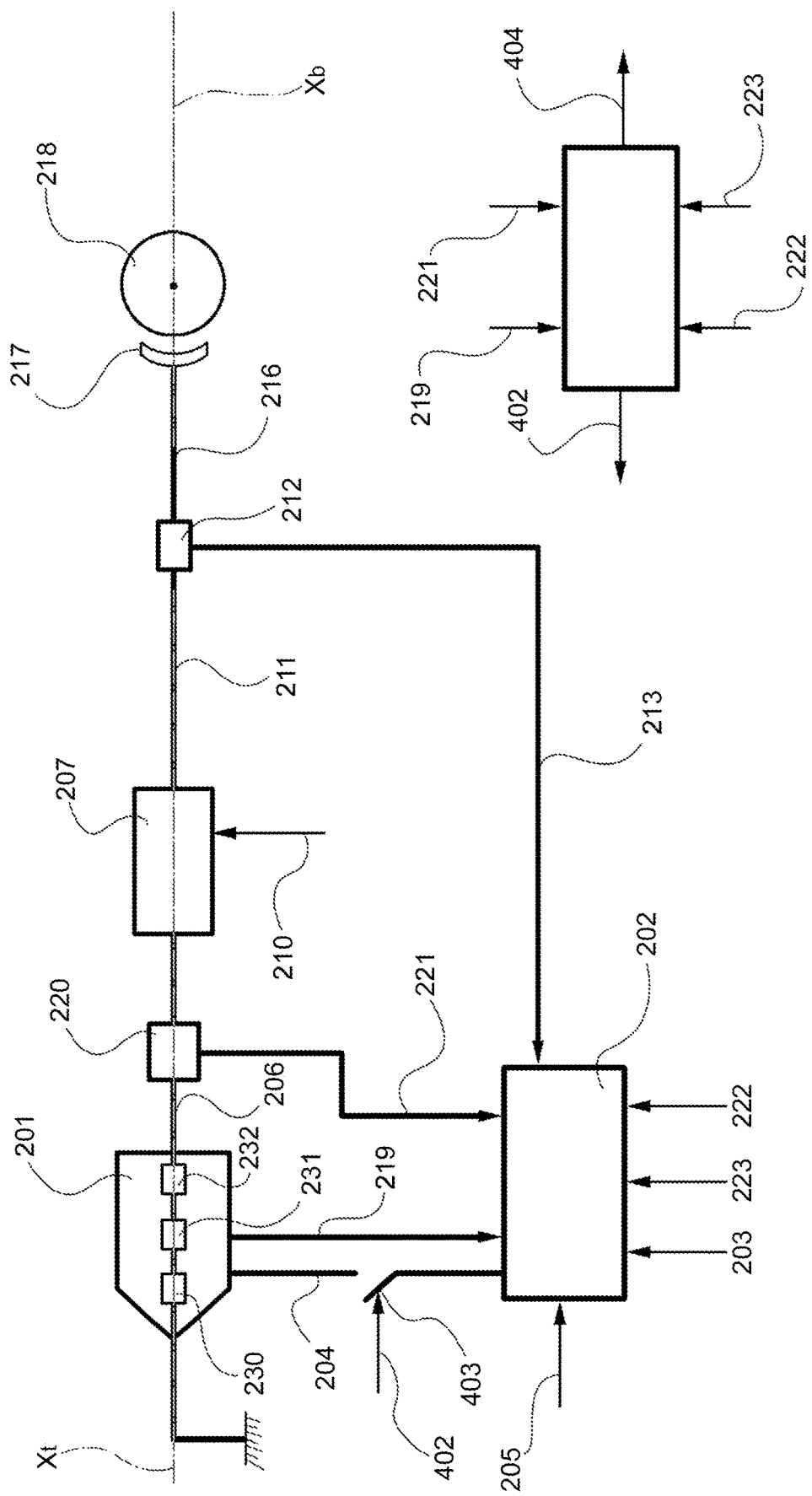
FIG. 4 illustrates an embodiment of an electromechanical braking actuator.

Still in reference to FIG. 4, the electromechanical braking actuator 400 may further comprise force sensor means 212 arranged to measure said braking force generated by the electromechanical module 201 and to generate a braking force indicative electrical signal 213. The value of the braking force indicative electrical signal 213 is indicative of the value of said first braking force. Force sensor means may be for example a load cell-type force sensor.

Additionally, the electromechanical braking actuator 400 may comprise, but is not limited to, position sensor means 220 arranged to measure the translational position of the force transmission members 206, 211, 216 arranged to transmit braking force from the electromechanical module 201 to the braking force application means 217. Said position sensor means 220 are further arranged to generate the electrical position signal 221.

The value of the electrical position signal 221 is indicative of the translational position of the braking force application means 217.

The position sensor means 220 may be, for example, an optical linear position sensor, or an LVDT linear transformer, or a magnetic linear position sensor.

Moreover, the electromechanical braking actuator 400 may comprise a first service braking control unit 202 arranged to receive at least:
  a service braking force request electrical signal 203;
  a power supply 205;
  a braking force indicative electrical signal 213;
  the electrical position signal 221 indicating the translational position of the braking force application means 217;
  the angular position electrical signal 219 indicating the angular position of one of the rotating parts making up the electromechanical module 201;
  the maintenance request signal 222 indicative of the need to replace the friction means of the braking force application means 217, having a first state in which it does not present a request to bring the braking force application means 217 into the maintenance position −B, a second state wherein it presents a request to bring the braking force application means 217 into the maintenance position −B, to facilitate maintenance of the braking force application means;
  a maintenance validation signal 223 indicative of the validation of the need to replace the braking force application means 217 having a first state wherein it does not confirm the permission to bring the braking force application means 217 into the maintenance position −B, and a second state wherein it confirms the permission to bring the braking force application means 217 into the maintenance position −B.

The service braking control unit 202 may further be arranged to control the electromechanical module 201, through the braking force control signal 204 to generate the braking force so as to have a value corresponding to, i.e., which is a function of, the value of the service braking force request signal 203.

Additionally, the service braking control unit 202 may be arranged to perform the calculation of integrating the angular position change indicated by the angular position signal 219 and converting it into a translational position value of the force transmission means 206, 211, 216 arranged to transmit the braking force from the electromechanical module 201 to the braking force application means 217.

If, during the application of a service braking, the service braking control unit 202 receives a request to reset the service braking force, the service braking control unit 202 reduces the braking force by continuously monitoring the force value indicated by the braking force indicative electrical signal 213.

At the instant when the braking force indicative electrical signal 213, which indicates the braking force value, indicates the null braking force value, the service braking control unit 202 is arranged to:
  store the translational position value of the braking force application means 217 as the "zero" reference point for the measurement of the rest distance −A;
  by means of the at least one braking force control signal 204, command the electromechanical module 201 to maintain the direction of rotation of the electric motor unchanged, at a predetermined speed of rotation;
  continuously monitor the variation of the translational position of the braking force application means 217, said translational position being obtained by means of the electrical position signal 221 indicating the translational position of the braking force application means 217, said translational position being alternatively obtained by performing the operation of integrating the angular position variation indicated by the angular position signal 219 associated with one of the rotating mechanical members comprised in the electromechanical module 201, and converting said angular position variation into a translational position value of the braking force application means 217;
  when the translational position of the braking force application means 217 has reached the distance −A, within a certain predetermined tolerance range with respect to the "zero" reference point stored in the first step, command the electromechanical module 201 to stop rotation, having reached the desired rest position, i.e., the distance −A.

Additionally, when the translational position of the braking force application means 217 has reached the distance −A, the service braking control unit 202 is arranged to:
  continuously monitor the status of the maintenance request signal 222 and the maintenance validation signal 223;
  when the maintenance request signal 222 is in its first state in which it does not present a request to bring the braking force application means 217 into the maintenance position −B, or when the maintenance validation signal 223 is in its first state wherein it does not confirm permission to bring the braking force application means 217 into the maintenance position −B, the service braking control unit 202 does not perform any action, pending the arrival of a new braking force request through the signal 203;
  when at the same time the maintenance request signal 222 assumes its second state in which it presents a request to bring the braking force application means 217 into the maintenance position −B, and the maintenance validation signal 223 assumes its second state in which it confirms permission to bring the braking force application means 217 into the maintenance position −B, the service braking control unit 202 commands the electromechanical module 201 to bring the braking force application means 217 into the maintenance position −B, allowing the operator tasked with maintaining the braking force application means, for example, to replace the friction means of the braking force application means;

from the previous state, i.e., the braking force application means 217 are in the maintenance position −B, when the maintenance request signal 222 has assumed its first state in which it does not present a request to bring the braking force application means 217 into the maintenance position −B, and the maintenance validation signal 223 has assumed its first state in which it does not confirm permission to bring the braking force application means 217 into the maintenance position −B, the service braking control unit 202 commands the electromechanical module 201 to bring the braking force application means 217 into contact with the disc in the case of a disc brake, or the wheel in the case of a wheel brake.

At the instant when the braking force indicative electrical signal 213 indicates a braking force value greater than the null value, i.e., indicates that the braking force application means 217 have come in contact with the disc in the case of a disc brake, or the wheel in the case of a wheel brake, the service braking control unit 202 again performs the previously described checks to reach the rest position −A.

Thus, the electromechanical actuator 400 has correctly reset the position of the braking force application means 217 after the maintenance of the braking force application means 217.

The electromechanical braking actuator 400 further comprises the safety unit 401 arranged to receive at least:
the braking force indicative electrical signal 213;
the electrical position signal 221 indicative of the translational position indicating the translational position of the braking force application means 217;
the electrical angular position signal 219 indicating the angular position of one of the rotating members of the electromechanical module 201;
the maintenance request signal 222 for a maintenance request of the friction means of the braking force application means 217;
the maintenance validation signal 223.

The service braking control unit 202 is arranged to perform the calculation of integrating the angular position change indicated by the angular position signal 219 and convert it to a translational position value of the force transmission members 206, 211, 216 arranged to transmit the braking force from the electromechanical module 201 to the braking force application means 217.

In the example in FIG. 4, the safety unit 401 is arranged to generate a control signal 402 for controlling the first interruption means 403 (e.g., an interrupting device such as a controlled switch, relay, etc.), to interrupt or not interrupt the braking force control signal 204 which also provides power.

Figure 5:
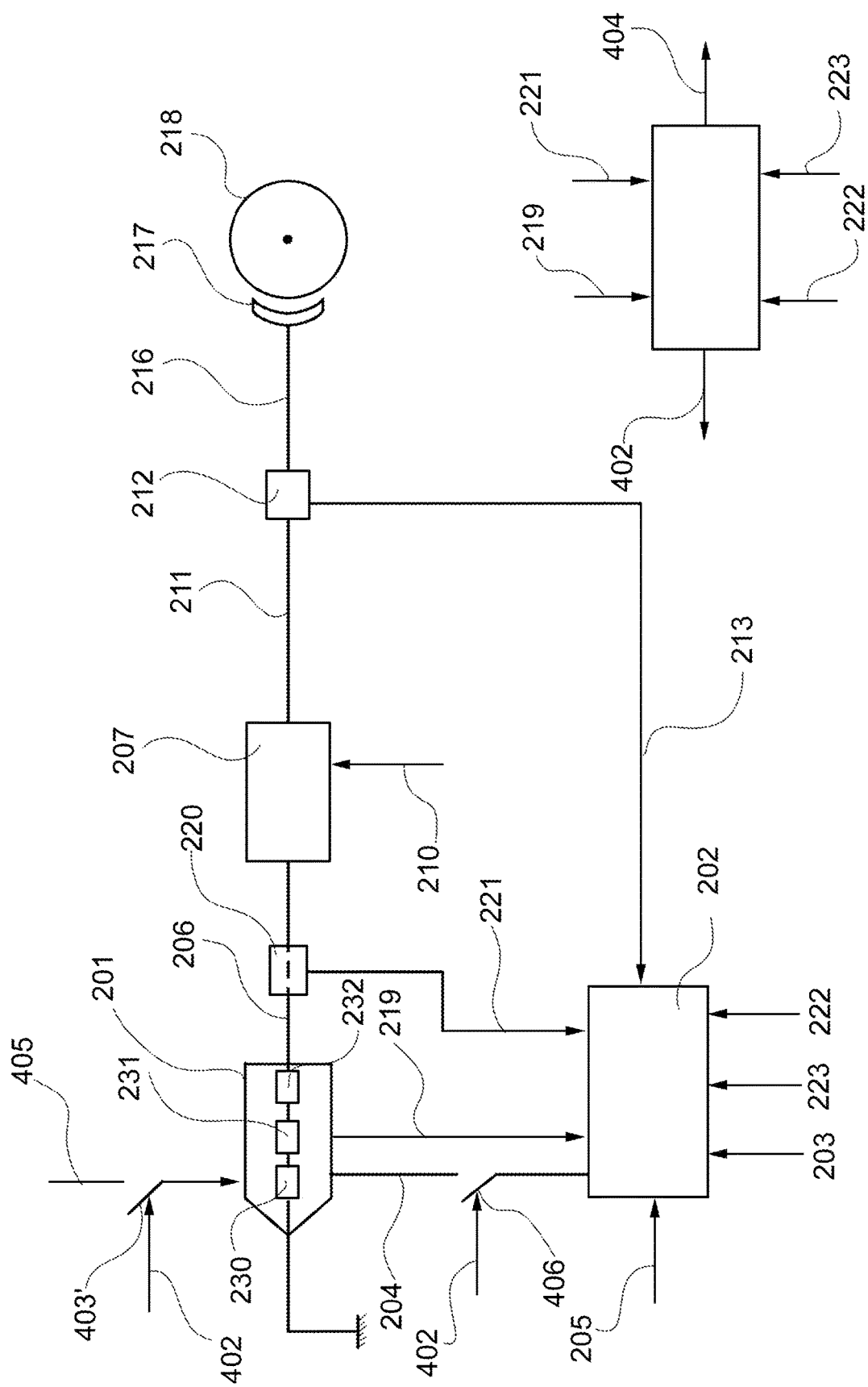
FIG. 5 illustrates an alternative embodiment of an electromechanical braking actuator.

When both the power signal 405 and the braking force control signal 204 are present, see the example in FIG. 5, the safety unit 401 may be arranged to generate a control signal 402 for controlling first interruption means 403' that interrupt or do not interrupt the power signal 405, and/or for controlling second interruption means 406 (e.g., an interruption device such as a controlled switch, relay, etc.), that interrupt or do not interrupt the braking force control signal 204.

When the braking force control signal 204 supplies power to the electromechanical module 201, the first interruption means 403 are arranged, when the control signal 402 does not command to interrupt the control and power to the electromechanical module 201, to allow the service braking control unit to power and control the electromechanical module 201 through the at least one braking force control signal 204. Additionally, the first interruption means 403 are arranged, when the control signal 402 commands to interrupt control and power to the electromechanical module 201, to prevent the service braking control unit from powering and controlling the electromechanical module 201 through the at least one control signal 204 by forcing the electromechanical module 201 to maintain the transmission member 206 in its current position at the instant of interruption of the at least one control signal 204.

When the power signal 405 is present, see for example FIG. 5, the first interruption means 403' are instead arranged, when the first control signal 402 does not command to interrupt the power to the electromechanical module 201, to provide power to the electromechanical module 201 through the power signal 405, and when the first control signal 402 commands to interrupt the power to the electromechanical module 201, to interrupt the power to the electromechanical module 201 coming from the power signal 405, forcing the electromechanical module 201 to maintain the transmission arm 206 in the current position at the instant of interruption of the at least one control and power signal 204.

In other words, by controlling the signal 402, the safety unit 401 may allow or prevent the control of the electromechanical module 201 by the service braking control unit 202.

The safety unit 401 may continuously monitor the braking force indicative signal 213. At the instant the braking force indicative signal 213 changes from a force value greater than zero and a braking force value of zero, the safety unit 401 performs the following steps:
stores the translational position value of the braking force application means 217 as the "zero" reference point for the measurement of the rest distance −A;
continuously monitors the variation of the translational position of the braking force application means 217, said translational position being obtained by means of the electrical position signal 221 indicating the translational position of the braking force application means 217, said translational position being alternatively obtained by performing the operation of integrating the angular position variation indicated by the angular position signal 219 associated with one of the rotating mechanical parts comprised in the electromechanical module 201, and converting said angular position variation into a translational position value of the braking force application means 217;
continuously monitors the status of the maintenance request signal 222 and the maintenance validation signal 223;
when the translational position of the braking force application means 217 has reached the distance −A and subsequently exceeds it in absolute value by proceeding to the distance −B, if at that time the maintenance request signal 222 is in its first state in which it does not present a request to bring the braking force application means 217 to the distance −B, or if at that time the maintenance validation signal 223 is in its first state in which it does not confirm permission to bring the braking force application means 217 into the position −B, the safety unit 401 acts on the signal 402 to switch the first interruption means 403' into the condition in which they interrupt the control signal 204 for the electromechanical module 201 (in the embodiment in which the braking force control signal 204 supplies the electromechanical module 201), or they interrupt the power signal 405 for the electromechanical module 201 (in the embodiment in which the power signal 405 powers the electromechanical module 201), forcing the electromechanical module 201 to maintain the transmission arm 206 in a position close to the distance −A, however ready for an emergency braking application. Additionally, the safety unit 401 sends an error indication through an error signal 404;

when the translational position of the braking force application means 217 has reached the maintenance position −A and subsequently exceeds it in absolute value by proceeding to the distance −B, if simultaneously the maintenance request signal 222 has assumed its second state in which it presents a request to bring the braking force application means 217 to the distance −B, and the maintenance validation signal 223 has assumed its second state in which it confirms permission to bring the braking force application means 217 into the maintenance position −B, the safety unit 401 does not perform any action, allowing the service braking control unit 202 to command the total translation of the braking force application means 217 to assume the maintenance position −B needed for the maintenance of the braking force application means 217, such as replacement of the friction means of the braking force application means 217. Upon reaching the maintenance position −B, the safety unit 401 acts on the signal 402 to switch the first interruption means to the condition in which they interrupt the braking control signal 204 for the electromechanical module 201 (in the embodiment in which the braking force control signal 204 supplies the electromechanical module 201), or the power supply signal 405 for the electromechanical module 201 (in the embodiment wherein the power supply signal 405 supplies the electromechanical module 201), forcing the electromechanical module 201 to maintain the transmission arm 206 in the maintenance position −B, allowing the maintenance operator to operate safely, protected from sudden improper movement of the braking force application means 217;

from the previous state, when the maintenance request signal 222 has assumed its first state in which it does not present a request to bring the braking force application means 217 into the maintenance position −B, and the maintenance validation signal 223 has assumed its first state in which it does not confirm permission to bring the braking force application means 217 into the maintenance position −B, the safety unit 401 acts on the signal 402 to switch the first interruption means 403 into the condition in which they do not interrupt the control and power supply signal 204 for the electromechanical module 201 (in the embodiment in which the braking force control signal 204 powers the electromechanical module 201), or do not interrupt the power supply signal 405 for the electromechanical module 201 (in the embodiment in which the power supply signal 405 supplies the electromechanical module 201), allowing the service braking force control module 202 to recover the rest position −A according to the controls described above.

When the power supply signal 405 supplies the electromechanical module 201, second interruption means 406 may also be provided that also interrupt the braking force control signal 204 when the power supply signal 405 is interrupted.

It is apparent that the safety unit 401 performs a simple monitoring, interruption, and alarm function, and consequently is much simpler in terms of implementation than the service braking control unit 202.

It is therefore expedient to develop the safety unit 401 to a higher SIL level than the SIL level at which the service braking control unit 202 was developed, i.e., the SIL level consistent with the application of emergency braking, as well as the safety requirements necessary to allow a maintenance operator to safely operate on the actuator for maintaining the braking force application means 217, such as replacement of the friction means of the braking force application means 217.

As heretofore described, it is known from the prior art that safety analyses carried out in accordance with standard EN50126 recommend the application of safety levels $SIL<=2$ for the development of HW-SW control units for service braking of a railway vehicle.

Developing the safety unit to a $SIL>=3$ level advantageously brings the complete play recovery function, due to the consumption of friction materials, and the function of maintaining friction materials to the same $SIL>=3$ level, at much lower development costs than the development of the complete service braking control unit performed according to $SIL>=3$ safety levels.

In order to keep the safety level path intact, it is recommended for the maintenance validation signal 223 to be designed to a SIL safety level equal to the SIL safety level at which the safety unit 401 was developed.

Figure 6:
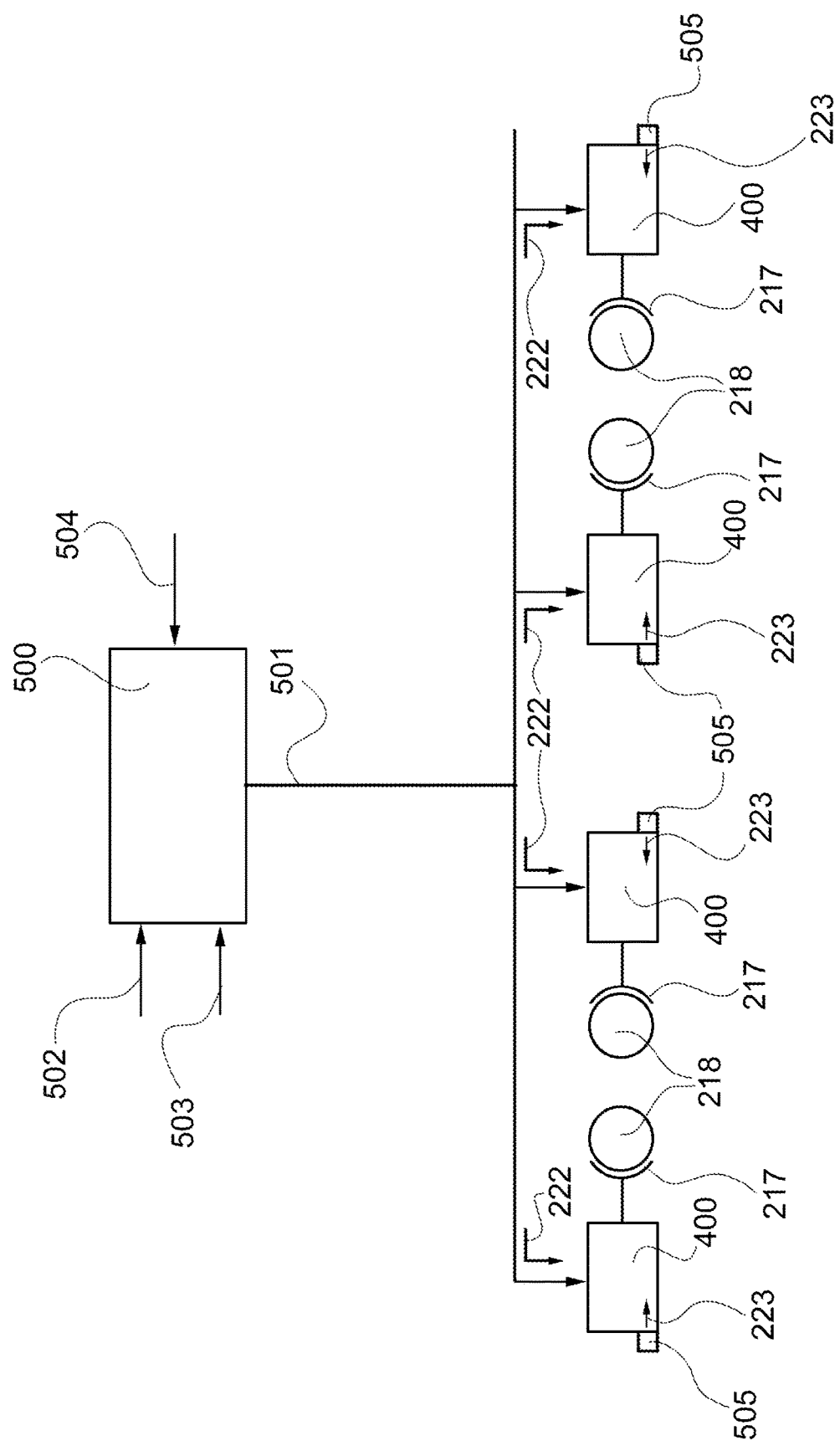
FIG. 6 illustrates an embodiment of a braking system including a plurality of braking actuators.

Referring to FIG. 6, in a further aspect, the invention relates to a braking system including a plurality of braking actuators 400 according to any of the embodiments or embodiment examples described above. The braking system includes a control unit 500 connected to the plurality of braking actuators 400 through communication means 501, such as a communication network, wired or wireless. The control unit is arranged to receive:

a parking brake signal (502), the value of which is indicative of whether or not a parking brake is applied;
at least one speed signal 503 indicative of vehicle speed;
a maintenance signal 504, the value of which is indicative of whether or not a maintenance cycle is requested of the braking system.

The control unit 500 is also arranged to:
generate the maintenance request signal 222 having its second value, to be transmitted to at least one of said electromechanical actuators 400 through said communication means 501, when the maintenance signal 504 assumes a value indicative of a maintenance request, and the parking brake signal 502 assumes a value indicative of the parking braking being applied, and the speed signal 503 assumes a value indicative of the vehicle speed being null; and
generate the maintenance request signal 222 with its first value, to be transmitted to the plurality of electromechanical actuators 400 through said communication means 501, when at least one of the following occurs: the maintenance signal 504 assumes a value that does not indicate a maintenance request; the parking brake signal 502 assumes a value indicative of parking braking not being applied; the speed signal 503 assumes a value indicative of a non-null vehicle speed.

Each of said electromechanical actuators 400 may comprise user interface means 503 through which an operator engaged in performing maintenance on the braking force application means 217 causes the maintenance validation signal 223 to assume its second value to bring the braking force application means 217 into the maintenance position and causes the maintenance validation signal 223 to assume its first value to bring the braking force application means 217 into the rest position upon completion of maintenance on the braking force application means 217, such as upon completion of replacement of the friction means of the braking force application means 217.

In other words, observing FIG. 6, a braking system may comprise a plurality of actuators 400 as heretofore described, managed by a centralized braking control unit 500, provided for safe implementation of the maintenance cycle of the friction materials.

A plurality of electromechanical actuators 400 may be connected to the braking system control unit 500 through said communication means 501. The braking system control unit 500 may be arranged to receive a signal 502 indicative of the parking braking being applied, at least one signal 503 indicative of the vehicle speed, a signal 504 indicative of a request to perform a maintenance cycle to the braking system.

The braking system control unit 500 is arranged to generate a maintenance request signal 222 to request maintenance for the friction means of the braking force application means 217 in its second state in which it presents a request to bring the braking force application means 217 into the maintenance position –B to facilitate replacement of the friction means, w % ben the braking system maintenance request signal 504 indicative of the request to perform a maintenance cycle to the system brake assumes the state in which it indicates the request to perform a braking system maintenance cycle, and the signal 502 indicative of the parking braking applied indicates a parking braking applied to the train, and the vehicle speed signal 503 indicates null speed.

Each electromechanical actuator 400 may comprise a user interface 503 through which the operator tasked with performing maintenance on the braking force application means 217 such as replacing the friction means may bring the maintenance validation signal 223 into its second state in which it confirms permission to bring the braking force application means 217 into the maintenance position –B.

The user interface 503 may comprise, but is not limited to, an interface for a computing means, the interface being arranged to generate bring the maintenance validation signal 223 into its second state in which it confirms permission to bring the braking force application devices 217 into the maintenance position –B, in the presence of a predetermined safety code.

The braking system control unit 500 is arranged to generate a maintenance request signal 222 in its second state in which it presents a request to bring the braking force application means 217 into the maintenance position –B, for only one electromechanical actuator 400 at a time.

In this way, the system ensures that only one actuator 400 at a time may be launched in the maintenance condition, for example for replacement of the friction materials of braking force application means 217, by the braking system control unit 500, and that only the local consent of the operator, through the use of the local user interface 503, definitively brings the individual electromechanical actuator 400 sent for maintenance into the condition of bringing the braking force application means 217 into the maintenance position –B.

Additionally, once the maintenance position –B is reached, only the action of the operator to remove the key from the user interface 505 allows the actuator 400 in the maintenance state to bring the braking force application devices 217 closer to the disc or wheel, ensuring that the operator may operate safely.

What has been described above with reference to the sector of railway vehicles or railway trains may also find similar application in other sectors such as, for example, the generic vehicle, rubber-tired vehicle, or rubber-tired convoys sector.

Various aspects and embodiments of an electromechanical braking actuator and braking system for a vehicle, particularly for at least one railway vehicle according to the invention have been described. It is understood that each embodiment may be combined with any other embodiment. Furthermore, the invention is not limited to the described embodiments, but may be varied within the scope defined by the appended claims.

The invention claimed is:

1. An electromechanical braking actuator for a vehicle, comprising:
   a service braking control unit arranged to receive a service braking force request electrical signal and generating a braking force control signal, the value of which is a function of said service braking force request electrical signal;
   an electromechanical module arranged to receive the braking force control signal generated by the service braking control unit and to generate a braking force, the value of which is a function of said braking force control signal, wherein said electromechanical module is arranged to also receive power through said braking force control signal;
   at least one force transmission member arranged to transmit the braking force generated by the electromechanical module to braking force application means, wherein said at least one force transmission member is arranged to be controlled by said electromechanical module so as to translate along a translation axis, wherein the translation of said at least one force transmission member according to a first application direction involves an increase of the braking force applied by the braking force application means and the translation of said at least one force transmission member according to a second application direction, opposite to said first application direction, involves a reduction of the braking force applied by the braking force application means;
   the electromechanical braking actuator comprising a safety unit arranged to:
   receive an electrical position signal, the value of which is indicative of the position of said braking force application means along said translation axis;
   determine an instantaneous position of the braking force application means based on the value of the electrical position signal; and
   through first interruption means, prevent the braking force control signal emitted by the service braking control unit from reaching the electromechanical module, when:
   a) based on the value of the electrical position signal, the safety unit determines that the braking force application means are in a position along a force application axis between a maintenance position at a first distance from braking force receiving means, and a rest position at a second distance from said braking force receiving means, less than said first distance;
   b) based on changes of the value of the electrical position signal over time, the safety unit determines that the braking force application means are moving from the rest position to the maintenance position.

2. The electromechanical braking actuator according to claim 1, wherein the safety unit is arranged to receive a maintenance request signal arranged to assume a first value indicative of the non-necessity of bringing the braking force application means into the maintenance position, and to assume a second value indicative of the necessity of bringing the braking force application means into the maintenance position;

said safety unit being also arranged to:
through said first interruption means, prevent the braking force control signal emitted by the service braking control unit from reaching the electromechanical module, when:
a) both the maintenance request signal assumes its first value and the safety unit determines, based on the value of the electrical position signal, that the braking force application means are in a position along said braking force application axis between said maintenance position and the rest position;
b) based on changes in value of the electrical position signal over time, the safety unit determines that the braking force application means are moving from the rest position to the maintenance position.

3. The electromechanical braking actuator according to claim 2, wherein the safety unit is arranged to further receive a maintenance validation signal, arranged to assume a first value indicative of a non-confirmation of permission to bring the braking force application means into the maintenance position and to assume a second value indicative of a confirmation of permission to bring the braking force application means into the maintenance position;

said safety unit being arranged to:
through said first interruption means, prevent the braking force control signal emitted by the service braking control unit from reaching the electromechanical module, when:
a) both the maintenance request signal and the maintenance validation signal assume their respective first values, and the safety unit determines, based on the value of the electrical position signal, that the braking force application means are in a position along said braking force application axis between said maintenance position and said rest position;
b) on the basis of changes in value of the electrical position signal over time, the safety unit determines that the braking force application means are moving from the rest position to the maintenance position;

and/or said safety unit being arranged to:
through said first interruption means, prevent the braking force control signal emitted by the service braking control unit from reaching the electromechanical module, when:
a) the maintenance request signal assumes its first value and the maintenance validation signal does not assume its first value, or, the maintenance request signal assumes its second value and the maintenance validation signal does not assume its second value; and
b) the safety unit determines, based on the value of the electrical position signal, that the braking force application means are in a position along said braking force application axis between said maintenance position and said rest position;

and/or said safety unit being arranged to:
through said first interruption means, allow the braking force control signal emitted by the service braking control unit to reach the electromechanical module, when both the maintenance request signal and the maintenance validation signal assume their respective second values, and the safety unit determines, based on the value of the electrical position signal, that the braking force application means are in the rest position.

4. The electromechanical braking actuator according to claim 3, wherein the safety unit is arranged, through said first interruption means, to prevent the braking force control signal emitted by the service braking control unit from reaching the electromechanical module, when:
both the maintenance request signal and the maintenance validation signal assume their respective second values; and
the safety unit determines, based on the value of the electrical position signal, that the braking force application means are in said maintenance position.

5. The electromechanical braking actuator according to claim 3, wherein when the braking force application means are in said maintenance position and both the maintenance request signal and the maintenance validation signal assume their respective first values:
the safety unit is arranged, through said first interruption means, to allow the braking force control signal emitted by the service braking control unit to again reach the electromechanical module;
the service braking control unit is arranged, by means of said braking force control signal, to bring said braking force application means into a braking application position in contact with said braking force receiving means, wherein the service braking control unit is arranged to determine that the braking application position coincides with the position in which said braking force application means are, when said braking force indicative electrical signal, after having assumed a null value, assumes a non-null value;
when said braking force application means reaches the braking application position in contact with said braking force receiving means, the service braking control unit is arranged, through said braking force control signal, to bring said braking force application means to a new rest position having again said second distance from the determined braking application position.

6. The electromechanical braking actuator according to claim 2, comprising force sensor means arranged to generate a braking force indicative electrical signal, the value of which is indicative of the value of said braking force generated by the electromechanical module;
the service braking control unit being arranged to receive said braking force indicative electrical signal.

7. The electromechanical braking actuator according to claim 6, wherein when the braking force application means are in said maintenance position and the maintenance request signal assumes its first value:
the safety unit is arranged, through said first interruption means, to allow the braking force control signal emitted by the service braking control unit to again reach the electromechanical module;
the service braking control unit is arranged, by means of said braking force control signal, to bring said braking force application means into a braking application position in contact with said braking force receiving means, wherein the service braking control unit is arranged to determine that the braking force application means have reached the braking application position when said braking force indicative electrical signal, after having assumed a null value, assumes a non-null value;

when said braking force application means reaches the braking application position in contact with said braking force receiving means, the service braking control unit is arranged, through said braking force control signal, to bring said braking force application means to a new rest position having again said second distance from the determined brake application position.

8. The electromechanical braking actuator according to claim 5, wherein when the braking force indicative electrical signal, after having assumed a non-null value, assumes again a null value, the service braking control unit is arranged to determine a braking release position in which the braking force application means are no longer in contact with said braking force receiving means;

the service braking control unit being arranged to bring said braking force application means, through said braking force control signal, into a new rest position having again said second distance from the determined braking release position.

9. The electromechanical braking actuator according to claim 1, wherein said electrical position signal is generated by position sensor means arranged to measure a position of said at least one force transmission member along said translation axis.

10. The electromechanical braking actuator according to claim 1, wherein the electromechanical module includes at least one rotating mechanical member and said electric position signal is generated by angular position sensor means arranged to measure the angular position and the direction of rotation of said at least one rotating member of the electromechanical module.

11. The electromechanical braking actuator according to claim 1, comprising an emergency braking module including emergency braking energy storage means arranged to store energy to be used for at least one emergency braking, wherein said emergency braking module is arranged to receive an emergency braking request signal and to assume a first state in which it does not release energy stored in the emergency braking storage means when the emergency braking request signal does not assume a value indicative of a necessity to carry out an emergency braking, and a second state in which it releases the energy stored in the emergency braking storage means when the emergency braking request signal assumes a value indicative of the necessity to carry out an emergency braking.

12. A electromechanical braking actuator for a vehicle, comprising:

a service braking control unit arranged to receive a service braking force request electrical signal and generating a braking force control signal, the value of which is function of said service braking force request electrical signal;

an electromechanical module arranged to receive the braking force control signal generated by the service braking control unit and to generate a braking force, the value of which is a function of said braking force control signal; wherein said electromechanical module is arranged to receive power through a power supply signal;

at least one force transmission member arranged to transmit the braking force generated by the electromechanical module to braking force application means, wherein said at least one force transmission member is arranged to be controlled by said electromechanical module so as to translate along a translation axis, wherein the translation of said at least one force transmission member according to a first direction of application involves the increase of the braking force applied by the braking force application means and the translation of said at least one force transmission member according to a second direction of application, opposite to said first application direction, involves the reduction of the braking force applied by the braking force application means;

the electromechanical braking actuator being characterized in that it comprises a safety unit arranged to receive an electrical position signal whose value is indicative of the position of said braking force application means along said translation axis;

wherein said safety unit 401 is arranged to:

determine an instantaneous position of the braking force application means based on the value of the electrical position signal; and through first interruption means, prevent the power supply signal (405) from reaching the electromechanical module, when:

a) based on the value of the electrical position signal, the safety unit determines that the braking force application means are in a position along a force application axis between a maintenance position at a first distance from braking force receiving means, and a rest position at a second distance from said braking force receiving means, less than said first distance;

b) based on changes in value of the electrical position signal over time, the safety unit determines that the braking force application means are moving from the rest position to the maintenance position.

13. The electromechanical braking actuator according to claim 12, wherein the safety unit is also arranged to receive a maintenance request signal arranged to assume a first value indicative of the non-necessity of bringing the braking force application means into the maintenance position, and to assume a second value indicative of the necessity of bringing the braking force application means to the maintenance position;

wherein said safety unit is arranged to:

through first interruption means, prevent the power supply signal from reaching the electromechanical module, when:

a) both the maintenance request signal assumes its first value and the safety unit determines, based on the value of the electrical position signal, that the braking force application means are in a position along said braking force application axis between said maintenance position and the rest position;

b) based on changes in value of the electrical position signal over time, the safety unit determines that braking force application means are moving from the rest position to the maintenance position.

14. The electromechanical braking actuator according to claim 13, wherein said safety unit is also arranged to receive a maintenance validation signal, arranged to assume a first value indicative of a non-confirmation of permission to carry the braking force application means into the maintenance position, and to assume a second value indicative of a confirmation of permission to bring the braking force application means into the maintenance position;

wherein said safety unit is arranged to:

through first interruption means, prevent the power supply signal from reaching the electromechanical module, when:

a) both the maintenance request signal and the maintenance validation signal assume their respective first values, and the safety unit determines, based on the value of the electrical position signal, that the braking force application means are in a position along said braking force application axis between said maintenance position and said rest position;

b) on the basis of changes in value of the electrical position signal over time, the safety unit determines that the braking force application means are moving from the rest position to the maintenance position;

and/or said safety unit being arranged to:

through said first interruption means, prevent the power supply signal from reaching the electromechanical module, when:

a) the maintenance request signal assumes its first value and the maintenance validation signal does not assume its first value, or, the maintenance request signal assumes its second value and the maintenance validation signal does not assume its second value; and b) the safety unit determines, based on the value of the electrical position signal, that the braking force application means are in a position along said braking force application axis between said maintenance position and said rest position;

and/or said safety unit being further arranged to:

through said first interruption means, allow the power supply signal to reach the electromechanical module, when both the maintenance request signal and the maintenance validation signal assume their respective second values, and the safety unit determines, based on the value of the electrical position signal, that the braking force application means are in the rest position.

15. The electromechanical braking actuator according to claim 14, wherein the safety unit is arranged to:

through the first interruption means, prevent the power supply signal from reaching the electromechanical module, when both the maintenance request signal and the maintenance validation signal assume their respective second values, and the safety unit determines, based on the value of the electrical position signal, that the braking force application means are in said maintenance position.

16. The electromechanical braking actuator according to claim 14, wherein when the braking force application means is in said maintenance position and both the maintenance request signal and the maintenance validation signal assume their respective first values:

the safety unit is arranged, through said first interruption means, to allow the power supply signal to again reach the electromechanical module;

the service braking control unit is arranged, by means of said braking force control signal, to bring said braking force application means into a braking application position in contact with said braking force receiving means, wherein the service braking control unit is arranged to determine that the braking application position coincides with the position in which said braking force application means are when said braking force indicative electrical signal, after having assumed a null value, assumes a non-null value;

when said braking force application means reach the braking application position in contact with said braking force receiving means, the service braking control unit is arranged, through said braking force control signal, to bring said braking force application means to a new rest position again having said second distance from the determined braking application position.

17. The electromechanical braking actuator according to claim 13, wherein when the braking force application means are in said maintenance position and the maintenance request signal assumes its first value:

the safety unit is arranged, through said first interruption means, to allow the power supply signal to reach again the electromechanical module;

the service braking control unit is arranged, by means of said braking force control signal, to bring said braking force application means into a braking application position in contact with said braking force receiving means, wherein the service braking control unit is arranged to determine that the braking force applying means have reached the braking applying position when said braking force indicative electrical signal, after having assumed a null value, assumes a non-null value;

when said braking force application means reaches the braking application position in contact with said braking force receiving means, the service braking control unit is arranged, through said braking force control signal, to bring said braking force application means into a new rest position having again said second distance from the determined braking application position.

18. The electromechanical braking actuator according to claim 12, wherein the safety unit is also arranged to:

through second interruption means, prevent the braking force control signal emitted by the service braking control unit from reaching the electromechanical module, when the safety unit prevents, through said first interruption means, the power supply signal from reaching the electromechanical module.

19. The electromechanical braking actuator according to claim 12, comprising force sensor means arranged to generate a braking force indicative electrical signal, the value of which is indicative of the value of said braking force generated by the electromechanical module;

the service braking control unit being arranged to receive said braking force indicative electrical signal.

20. The electromechanical braking actuator according to claim 19, wherein when the braking force indicative electrical signal, after having assumed a non-null value, assumes again a null value, the service braking control unit is arranged to determine a braking release position in which the braking force application means is no longer in contact with said braking force reception means;

the service braking control unit being arranged to bring, by means of said braking force control signal, said braking force application means into a new rest position having again said second distance from the determined braking release position.

* * * * *